United States Patent Office 3,577,365
Patented May 4, 1971

3,577,365
NOVEL BLENDS OF CHLORINATED CARBOXYL GROUP CONTAINING POLYMERS AND ETHYLENE-VINYL ACETATE COPOLYMERS
Paul D. Folzenlogen and Hugh J. Hagemeyer, Jr., Longview, Tex., assignors to Eastman Kodak Company, Rochester, N.Y.
No Drawing. Filed Feb. 7, 1969, Ser. No. 797,703
Int. Cl. C08f 29/12
U.S. Cl. 260—4          12 Claims

ABSTRACT OF THE DISCLOSURE

Compositions comprising blends of chlorinated carboxyl group containing polymers and ethylene-vinyl acetate copolymers. These compositions provide tough, flexible coatings having excellent adhesion to various substrates. These coatings have good resistance to chemical and solvent attack and embrittlement on aging and are useful in the protective coatings field.

---

This invention relates to novel chlorinated carboxyl group containing hydrocarbon compositions. One aspect of this invention relates to blends of chlorinated carboxyl group containing hydrocarbon compositions and ethylene vinyl acetate polymers. Another aspect of this invention relates to forming coatings having improved physical properties from these compositions.

Chlorinated carboxyl group containing hydrocarbon polymers, such as chlorinated natural rubbers and chlorinated poly-α-olefins can be used in the protective coatings field. These resins, however, for some applications form coatings which are too brittle and must be plasticized for applications requiring tough flexible coatings. The plasticizers commonly employed in the art consist of two types, liquid and thermosets. Typical liquid types are dioctyl phthalate, chlorinated paraffin wax, and the chlorinated biphenyls and terphenyls. Typical thermosetting plasticizers are the alkyl resins. A good plasticizer should have low volatility, resistance to leaching by solvents, and resistance to attack by acids and bases. In general, however, the liquid plasticizers tend to leach with solvents and are volatile, while the thermosetting plasticizers usually exhibit improved solvent resistance and non-volatility, but have poor resistance to attack by acids and bases. It is thus apparent that where the chlorinated carboxyl group containing polymers form coatings which are to be contacted by solvents and acidic or basic materials, the prior art plasticizers are not adequate.

In addition to the above problems in plasticizing chlorinated carboxyl group containing hydrocarbon polymers, in order to improve their toughness or flexibility, they must be polymerized to a higher molecular weight which often results in viscosities too high for many applications, such as solution coating applications. It would, therefore, be an advance in the state of the art to provide chlorinated carboxyl group containing hydrocarbon compositions having a viscosity low enough to give good processibility while maintaining solids content sufficiently high to form coatings by a one-step process having good toughness and flexibility.

Accordingly, it is one object of this invention to provide novel coating compositions containing chlorinated hydrocarbons.

Another object of the invention is to provide chlorinated carboxyl group containing hydrocarbon compositions.

Another object of this invention is to provide chlorinated carboxyl group containing rubber compositions.

A further object of the invention is to provide chlorinated carboxyl group containing cystalline polyolefin compositions.

A still further object of this invention is to provide chlorinated hydrocarbon compositions capable of forming coatings having good toughness, adhesion and flexibility.

One further object of the invention is to provide chlorinated hydrocarbon compositions having high solids contents and easily processable to form good coatings by a one-step process.

Another and still further object of this invention is to provide coatings for polyolefins having good resistance to chemical and solvent attack and resistance to embrittlement on aging.

Further objects and advantages of the invention will be apparent to those skilled in the art from the following disclosure and claims.

In accordance with this invention, it has been found that when ethylene-vinyl acetate copolymers are blended with chlorinated carboxyl group containing hydrocarbon polymers, these blends form coatings having good toughness, adhesion, and resistance to chemical attack. Also these blends have good processable viscosities, thereby providing compositions which can be easily applied to a substrate. Since the ethylene-vinyl acetate copolymers are not volatile and are of sufficiently high molecular weight as to be only slightly and selectively soluble, the blends form coatings that retain their good physical properties for extended periods of time. Moreover, these coatings also have, in addition to their other desirable properties, excellent gloss, transparency, and high resistance to permeation by moisture vapor.

The chlorinated carboxyl group containing hydrocarbon compositions are prepared by chlorinating carboxyl group containing hydrocarbons. Such carboxyl-containing hydrocarbons are prepared, for example, from amorphous and crystalline poly-α-olefins as well as synthetic and natural rubbers. One such carboxyl group containing hydrocarbon can be prepared by reacting a low viscosity amorphous or crystalline poly-α-olefin prepared from α-olefins containing at least 2 carbon atoms with an unsaturated polycarboxylic acid, anhydrides or esters thereof, preferably in the presence of free radicals. One suitable homopolymeric or copolymeric low viscosity poly-α-olefin can be prepared by thermally degrading conventional high molecular weight poly-α-olefin prepared by conventional polymerization processes. These poly-α-olefins are, for example, high, medium, and low density polyethylene, crystalline polypropylene, amorphous polypropylene, polybutene-1, polypentene-1, ethylene/propylene copolymers, and the like. For example, one suitable conventional polymer is the polypropylene prepared according to U.S. Pat. 3,412,078.

Thermal degradation of the conventional homopolymers or copolymers is accomplished by heating at elevated temperatures causing the polymer chain to rupture apparently at the points of chain branching of the polymeric material. The degree of degradation is controlled by reaction time and temperature to give a thermally degraded low molecular weight polymeric material having a melt viscosity range from about 100–5,000 cp. at 190° C. (ASTM–D1238–57T using .04±.0002 inch orifice) and an inherent viscosity of about .1 to .5, measured in tetralin at 145° C. By carefully controlling the time, temperature and agitation, a thermally degraded poly-α-olefin of relatively narrower molecular weight range than the starting high molecular weight polymer is obtained. This degradation is carried out at a temperature from 290° C. to about 425° C. These low viscosity poly-α-olefins prepared by thermally degrading conventional high molecular weight polymers are not emulsifiable as such; but upon reaction with unsaturated polycarboxylic acids, anhydrides, or esters thereof, the acid number and saponification number are increased to a number greater than 15 to provide an emulsifiable material. If the acid number and the saponification number are less than 15, the material is not emulsified.

Another suitable low viscosity poly-α-olefin is prepared by polymerizing to a melt viscosity of from about 100 to 5,000 cp. as measured at 190° C. (ASTM–D1238–57T using .04±.0002 inch orifice). These low viscosity poly-α-olefins are reacted with unsaturated polycarboxylic acids, anhydrides or esters thereof at temperatures generally less than 350° C., preferably from about 150–300° C. in the presence of a free radical source which can be used as a catalyst. Suitable free radical sources are, for example, peroxides such as ditertiary butyl peroxide, tertiary butyl hydroperoxide, cumene hydroperoxide, or azo compounds, such as azobis(isobutyronitrile), or irradiation sources. Suitable irridation sources include, for example, those from cobalt, uranium, thorium, and the like and ultraviolet light. Preferably, about 1 to 10% organic unsaturated polycarboxylic acid, anhydride or esters thereof, based on the weight of the low viscosity polyolefin, can be used in the invention. By using a free radical source, the temperature of reaction is reduced. The amount of peroxide or free radical agent used is generally quite low being of the order of about .01 to about .5% based on the weight of the low viscosity poly-α-olefin. The reaction may be carried out either in a batchwise or in a continuous manner with contact times in the order of about 10 minutes to about 2 hours.

Suitable unsaturated polycarboxylic acids and anhydrides are, for example, maleic acid, maleic anhydride, fumaric acid, citraconic anhydride, aconitic anhydride, and itaconic anhydride. Suitable esters are, for example, the half or full esters derived from methyl, ethyl, dimethyl maleate, dimethyl fumarate, methyl ethyl maleate, dibutyl maleate, dipropyl maleate, and the like, or those compounds which form these compounds at elevated reaction temperatures such as citric acid, for example. These modified low molecular weight poly-α-olefin compositions have a melt viscosity of 100–5,000 centipoises at 190° C. and a saponification number of at least 6, preferably about 7–30. It has been observed in the present invention that the melt viscosity of the product increases slightly. This increase in melt viscosity may be due to a slight degree of crosslinking or to copolymerization of the wax material with maleic anhydride.

One method for the determination of the saponification number is as follows: Weigh approximately 4 g. of the sample into a 500 ml. alkali-resistant Erlenmeyer flask and add 100 ml. distilled xylene. Heat under a reflux condenser for 1 hour. Cool the solution to 75° C. or less, and add from a buret 30 ml. standardized .10 N KOH in ethyl alcohol. Heat under a reflux for 45 min. Cool, and add from a buret standardized .10 N CH₃COOH in xylene until the mixture is acid to phenolphthalein. Add at least 1 ml. excess CH₃COOH. Reheat the solution under reflux for 15 min. Remove from heat, add 5 ml. water, and titrate to a faint pink end point with .10 N KOH in ethyl alcohol. Run a blank in this manner using the same amounts of reagents and the same heating times.

$$\frac{[(\text{ml. KOH} \times N) - (\text{ml. CH}_3\text{COOH} \times N)]\,(\text{for sample})}{\text{g. Sample}} \times 56.1 = \text{Sap. No.}$$
$$[(\text{ml. KOH} \times N) - (\text{ml. CH}_3\text{COOH} \times N)]\,(\text{for blank})$$

The unreacted unsaturated polycarboxylic acid can be separated from the reaction mixture by purging the reaction mixture with an inert gas while the melt temperature is between 200 and 300° C. After the unreacted unsaturated polycarboxylic acid has been removed, the modified polymer can be further purified by vacuum stripping, solvent extraction, or washing in an aqueous medium and isolating by removing the solvent or water.

The chlorination procedure is carried out in a slurry or solution and may be carried out either batchwise or continuously in a stirred vessel or tubular reactor. The diluent or solvent used should be one which is inert to elemental chlorine and to hydrogen chloride which is the principal by-product of the reaction. Suitable solvents include halogenated aromatics and halogenated aliphatics such as carbon tetrachloride. The solvent must be of a high degree of purity and contain very low amounts, less than about 100 p.p.m., and preferably less than about 1 p.p.m., of components which yield ash on burning. The solvent should be colorless and low boiling for easy removal from the polymer product. It is noted that the ash content of the chlorinated, poly-α-olefin product is preferably less than about 0.01% by weight of the polymer.

The concentration of carboxyl group containing hydrocarbon in the chlorination solvent may be varied, but generally should not exceed about 20% by weight, the preferred range being from about 5 to about 12% by weight. Concentrations greater than about 20% provide solutions of high viscosity which are difficult to agitate adequately. The chlorination temperature may also be varied, but at about 160° C., the chlorinated carboxyl group containing hydrocarbon becomes susceptible to degradation. At a chlorination temperature of less than 50°, the reaction is extremely slow. Generally, the preferred temperature range for the chlorination is from about 50 to about 120° C. In some instances it is desirable that the reaction be carried out under a moderate chlorine pressure in order to increase the solubility of the chlorine in the liquid phase. Generally, the reaction is carried out merely by adding chlorine gas into a well-stirred solution of the carboxyl group containing hydrocarbon dissolved in a suitable solvent.

The progress of the chlorination reaction can be followed in a number of ways. The preferred method is to periodically isolate a sample of the chlorinated hydrocarbon and determine the density of this material. The chlorine content is directly related to density and can be determined from a graph showing the amount of chlorine vs. the increase in viscosity. Alternative ways to determine the chlorination is to (1) determine the viscosity of the reaction mixture, or (2) measure the quantity of hydrogen chloride liberated in the course of the reaction. When the desired chlorine content is reached, the chlorinated hydrocarbon product may be isolated by any of a number of methods well known in the art. The solvent may be removed by stripping with a hot gas or by vacuum distillation.

The chlorinated carboxyl group containing hydrocarbon is chlorinated until the desired chlorine content is obtained. The chlorinated carboxyl group containing hydrocarbon should have a chlorine content of from about 50 to about 75 weight percent, preferably 60 to 70, and, most preferably, 65 weight percent. These chlorinated hydrocarbons form excellent coatings on surfaces such as metal surfaces and have good toughness, flexibility, gloss, transparency, stability and solvent resistance. Hydrocarbons having a chlorine content of less than 50 weight percent are too soft to form coatings, and hydrocarbons having a chlorine content of more than 75 weight percent form coatings that are too brittle.

The chlorinated carboxyl group containing hydrocarbons are blended with ethylene-vinyl acetate copolymers. Suitable ethylene-vinyl acetate copolymers comprise from about 10 to about 90 percent by weight of vinyl acetate, and preferably, from about 15 to about 50 percent. Examples of such copolymers are: (1) 29% vinyl acetate, melt index=10; (2) 33% vinyl acetate, melt index=25;

and (3) 40% vinyl acetate, melt index=30. The copolymerization of ethylene and vinyl acetate may be carried out batchwise or continuously in the presence of a catalyst, such as an organic peroxide such as tertiary butyl hydroperoxide, at a pressure from about 300 to 3000 atmospheres, preferably from about 1000 to 3000 atm., and at a temperature of from about 100 to 250° C. A tubular reactor, stirred autoclave, or other equipment can be used. A specific example for preparing these copolymers is as follows:

A stainless steel rocker bomb of 1400 ml. capacity was charged with 160 grams of vinyl acetate and 0.40 gram of tertiarybutyl peroxide. The bomb was sealed, pressurized with ethylene, and heated to 135° C. and 300 atm. pressure for three hours. The resulting copolymer contained 37 wt. percent vinyl acetate and had an inherent viscosity of 0.5 as measured at 0.25 wt. percent in toluene at 30° C.

In general, these preferred copolymers are preferably soluble in toluene at room temperature, are solid resins, and are compatible with the chlorinated carboxyl group containing hydrocarbons and poly-α-olefins. The copolymers comprise from about 10 to about 90% by weight of the total polymer weight of the blend, and preferably from about 30 to about 50% by weight.

The blends of the present invention are preferably prepared by co-dissolving the ethylene-vinyl acetate copolymer and the chlorinated hydrocarbon polymer in common solvents. For film-forming applications, such as paints and coatings, the coating can be cast from this solution and the blend allowed to dry by evaporation. Solutions containing less than about 20 weight percent solids do not contain sufficient polymer to form adequate coatings and above 50 weight percent are too viscous to form continuous coatings. For other applications, the blend can be coprecipitated from the solvent and dried. The most economical co-solvents are the aromatics such as toluene, xylene, and the alkylated benzenes or mixtures thereof. Other solvents, such as the chlorinated hydrocarbons, and combinations of solvents, such as an aromatic and an aliphatic hydrocarbon, can also be used.

The blends of chlorinated carboxyl containing polyolefins and hydrocarbons can be used as coatings on various types of substrates. Such substrates include polyolefins such as polyethylene and polypropylene, and also metal surfaces such as copper wire, aluminum foil, steel and the like. These blends can also be used to prepare paints, such as conventional lacquer types.

These coatings can also contain conventional additives such as stabilizers, fillers, pigments, vinyl plasticizers (monomeric or polymeric), resinous modifiers, solvents, and the like. Particular examples of such plasticizers include tricresyl phosphate, chlorinated polyphenyls, phthalates such as DOP, and drying oils such as linseed or tung oil, and chlorinated paraffin waxes.

This invention can be further illustrated by the following examples of preferred embodiments thereof, although it will be understood that these examples are included merely for purposes of illustration and are not intended to limit the scope of the invention unless otherwise specifically indicated.

EXAMPLE 1

About 250 grams of highly crystallizable high molecular weight polypropylene having a heptane index of greater than 95% and an inherent viscosity of about 2.0 was placed in a glass round-bottomed flask. The flask was purged with dry nitrogen to remove air, and it was carefully immersed in a Wood's metal bath maintained at 350° C. After the polymer melted, it was stirred and maintained at 350° C. for about 1 hour. The flask was removed from the metal bath. After the polymer had cooled to about 200° C., it was poured from the flask onto a metal tray. On cooling to about ambient temperature, the hard brittle waxy material was easily granulated and had a inherent viscosity of about .42.

Low viscosity thermally degraded polymers can also be produced in the above manner from high molecular weight polyethylene, poly-1-butene, poly-1-pentene, poly-1-hexene, poly-5-methyl-1-pentene and poly-1-dodecene.

EXAMPLE 2

About 125 grams of the low viscosity polypropylene prepared according to Example 1 and having a melt viscosity of 3,300 centipoise at 190° C. and an inherent viscosity of about .42 and 7.5 g. of maleic anhydride were placed in a 500 ml., three-necked flask fitted with a metal sweep stirrer, a dropping funnel, and a steam-jacketed condenser to return maleic anhydride which boiled out of the reaction mixture. The flask was lowered into a metal bath whose temperature was controlled at 200° C. After the mixture had melted down, it was stirred and di-t-butyl peroxide (.38 g.) dissolved in 10 ml. of dry heptane was added dropwise from the dropping funnel to the reaction mixture with stirring. About 30 minutes were required to add all of the di-t-butyl peroxide solution in this manner. The reaction mixture was stirred for an additional 30 minutes at 200° C. At the end of this time, the flask was removed from the metal bath and poured into a metal tray. The product was a very light-colored material with no apparent black specks or discolored products in it. The melt viscosity of the final product was 3600 cp. at 190° C., and the saponification number of the product was 16.

Carboxyl group containing polymers can also be produced in the above manner from thermally degraded polyethylene, poly-1-butene, poly-1-pentene, and the like. Also, similar results were obtained when other unsaturated carboxyl group containing compounds, such as maleic and fumaric acid, were used instead of maleic anhydride.

EXAMPLE 3

A low-viscosity polyethylene prepared directly to a melt viscosity of about 9000 cp. at 150° C. and a density of 0.907 was reacted according to the procedure of Example 2 using a reaction time of 3 hours to produce an emulsifiable product having a melt viscosity of 9,200 cp. at 150° C., an inherent viscosity of 0.37, and a saponification number of 18.8.

Carboxyl group containing polymers can also be prepared in the above manner from low viscosity undegraded polymers such as polypropylene, poly-1-butene, and the like.

EXAMPLE 4

A total of 125 g. of amorphous polypropylene having an I.V. of .27 and 6.3 grams of maleic anhydride was placed in a 300 ml. stainless steel rocking autoclave. The autoclave was purged with dry nitrogen to remove air, and it was heated to 325° C. and maintained at this temperature with rocking for 30 minutes. The product was removed from the autoclave, and the waxy material had an inherent viscosity of .2, a saponification number of about 31.5, a flow point of 64–78° C. and a penetration hardness of 29 (measured with a 50 gram weight for 5 seconds at 25° C.).

Low viscosity maleated polymers were also produced in the above manner from amorphous 50/50 propylene/1-butene copolymer, 95/5 propylene/1-pentene copolymer, 90/10 propylene/1-hexene copolymer, 80/20 propylene/4-methyl-1-pentene copolymer, 75/25 propylene/1-dodecene copolymer and 90/10 1-butene/1-hexene copolymer.

EXAMPLE 5

A carboxyl group containing polyethylene having a density of about 0.937 can also be prepared by oxidizing a thermally degraded non-emulsifiable polyethylene. For example, a 500 ml., 3-neck, round-bottom flask equipped with a stirrer, an inlet tube extending to the bottom of the flask and an exit for off gas, is charged with 300 g. of thermally degraded nonemulsifiable polyethylene having a molecular weight of 500, an acid number of substantially zero and a density of about 0.924, and the flask is placed in an oil bath at approximately 150° C. After the polyethylene has become molten, the stirrer is started, and oxygen flow is begun through the inlet tube at a rate of about 1 liter per minute. Samples of the polyethylene are removed periodically and the progress of the oxidation determined by measuring the acid number of the samples. After 5 hours, an acid number of 15.8 is obtained. The Ring and Ball softening point (ASTM D36–26) of the polyethylene is 102.2° C., and the penetration hardness (ASTM D5–52) at 23° C. is 0.18 mm.

Carboxyl group containing polymers can also be prepared in the above manner from polypropylene, poly-1-butene, and the like.

EXAMPLE 6

Two hundred grams of the carboxyl group containing polypropylene of Example 2 was dissolved in 1500 ml. of distilled chlorobenzene and placed in a 3-liter, 3-neck flask fitted with stirrer and inlet and outlet tubes for chlorine.

Chlorine, at a rate of 2.44 grams per minute, was passed into the stirred mixture for 2 hours and 55 minutes at 115–117° C. The chlorobenzene was vacuum stripped from the polymer and replaced with xylene. A homogeneous solution was obtained. A sample of the solid chlorinated material was isolated and analyzed. The percent chlorine was about 68.

Chlorinated carboxyl group containing polymers can also be produced in the above manner from carboxyl group containing polymers prepared according to the preceding examples and include carboxyl group containing amorphous polypropylene, carboxyl group containing natural rubber, carboxyl group containing ethylene-isopropanol telomers such as disclosed in U.S. Pat. 2,504,400 and the like. The chlorine content of the chlorinated carboxyl group containing polymer can be changed by increasing or decreasing the time that the carboxyl group containing polymer is chlorinated.

EXAMPLES 7–11

The following solutions can be prepared by stirring the ingredients into xylene at 25° C. Films of each of these formulations can be formed by casting onto 1/32-inch thick steel and 1/20-inch thick aluminum panels and the properties of the films measured after drying at 60° C. for 12 hours. These examples demonstrate the superior combination of toughness and adhesion obtainable with coatings of blends of chlorinated carboxyl-containing polymers and ethylene-vinyl acetate copolymers. The adhesion is tested as follows:

The dry adhesion test consists of checking the coatings down to the substrate with a razor blade and then seeing if cellophane tape will life the checks. The checks are approximately 1/25 inch square. The wet adhesion test consists of checking the coating, soaking the checked coating in water for 7 hours, wiping them dry, and immediately testing with cellophane tape. Since water is the main cause of lifting or blistering, this is an important test which few coatings pass.

|  | Example number | | | | |
|---|---|---|---|---|---|
|  | 7 | 8 | 9 | 10 | 11 |
|  | Weight percent | | | | |
| Ingredient: | | | | | |
| Chlorinated oxidized polyethylene 65% Cl | 65 | | | | 67 |
| Chlorinated oxidized ethyleneisopropanol telomer, 65% Cl | | 65 | | | |
| Chlorinated maleated polyethylene, 65% Cl | | | 65 | | |
| Chlorinated polyethylene, 65% Cl | | | | 65 | |
| Ethylene-vinyl acetate copolymer (40% vinyl acetate) | 35 | 35 | 35 | 35 | |
| Chlorinated biphenyl | | | | | 33 |
| Xylene | 200 | 200 | 200 | 200 | 200 |
| Film properties: | | | | | |
| Percent elongation, conical mandrel | 32 | 32 | 32 | 32 | 32 |
| Sward Hardness, percent of glass | 50 | 49 | 55 | 51 | 30 |
| Impact strength of 1-mil coat of 1/32-inch steel, in.-lb.: | | | | | |
| a. Forward | 30 | 30 | 30 | 30 | 20 |
| b. Reverse | 30 | 30 | 30 | 30 | 5 |
| Adhesion to steel: | | | | | |
| a. Dry | (1) | (1) | (1) | (1) | (1) |
| b. Wet | (1) | (1) | (1) | (2) | (1) |
| Adhesion to aluminum: | | | | | |
| a. Dry | (1) | (1) | (1) | (1) | (1) |
| b. Wet | (1) | (1) | (1) | (2) | (1) |

¹ Excellent.
² Poor.

EXAMPLES 12–15

The following blends were made in xylene, and the properties of the coatings were obtained by the same procedure as used in Examples 7–11.

|  | Example number | | | |
|---|---|---|---|---|
|  | 12 | 13 | 14 | 15 |
|  | Weight percent | | | |
| Ingredient: | | | | |
| Chlorinated maleated crystalline polypropylene ¹, 66.4% Cl | 60 | | | |
| Chlorinated maleated amorphous polypropylene ², 68.6% Cl | | 60 | | |
| Chlorinated maleated polybutadien ³, 64% Cl | | | 64 | |
| Chlorinated maleated natural rubber ⁴, 68.6% Cl | | | | 65 |
| Ethylene-vinyl acetate copolymer (40% vinyl acetate) | 40 | | | |
| Elvax 150 ethylene-vinyl acetate copolymer (33% vinyl acetate) | | 40 | | |
| Elvax 260 ethylene-vinyl acetate copolymer (29% vinyl acetate) | | | 36 | |
| Elvax 420 ethylene-vinyl acetate copolymer (18% vinyl acetate) | | | | 35 |
| Xylene | 200 | 200 | 200 | 200 |
| Film properties: | | | | |
| Percent elongation, conical mandrel | 32 | 32 | 32 | 32 |
| Sward Hardness, percent of glass | 30 | 33 | 42 | 52 |
| Impact strength of 1-mil film on 1/32-inch steel, in.-lb.: | | | | |
| a. Forward | 30 | 30 | 30 | 30 |
| b. Reverse | 30 | 30 | 30 | 30 |
| Adhesion to steel: | | | | |
| a. Dry test | (5) | (5) | (5) | (5) |
| b. Wet test | (5) | (5) | (5) | (5) |
| Adhesion to aluminum: | | | | |
| a. Dry test | (5) | (5) | (5) | (5) |
| b. Wet test | (5) | (5) | (5) | (5) |

¹ Molecular weight=21,000; carboxyl content=1.1 weight percent; viscosity of a 33 weight percent solids in toluene solution=550 cp. at 25° C.
² Molecular weight=6,600; carboxyl content=.55 weight percent; viscosity of a 33 weight percent solids in toluene solution=40 cp. at 25° C.
³ Molecular weight=32,000; carboxyl content=2.4 weight percent; viscosity of a 33 weight percent solids in toluene solution=1,100 cp. at 25° C.
⁴ Molecular weight=19,000; carboxyl content=1.3 weight percent; viscosity of a 33 weight percent solids in toluene solution=140 cp. at 25° C.
⁵ Excellent.

EXAMPLES 16–20

The following coatings demonstrate the use of other resins and plasticizers with the chlorinated carboxyl-containing resins-ethylene vinyl-acetate copolymer blends. These coatings were prepared and tested as were the coatings shown in Examples 7 through 11.

| | Example Number | | | | |
|---|---|---|---|---|---|
| | 16 | 17 | 18 | 19 | 20 |
| | Weight percent | | | | |
| Ingredient: | | | | | |
| Chlorinated oxidized polyethylene (68% Cl) | 67.5 | 50.0 | 45.0 | 66.7 | 66.7 |
| Ethylene-vinyl acetate copolymer (40% vinyl acetate) | 7.5 | 33.3 | 30.0 | 33.3 | 33.3 |
| Unichlor [1] 40 | 25.0 | | | | |
| Unichlor [2] 70AX | | | 25.0 | | |
| Arochlor [3] 5460 | | 16.7 | | | |
| Arochlor [4] 1260 | | | | 10.0 | |
| Tricresyl phosphate | | | | | 15.0 |
| Xylene | 200.0 | 200.0 | 200.0 | 200.0 | 200.0 |
| Film properties: | | | | | |
| Percent elongation, conical mandrel | 32 | 32 | 32 | 32 | 32 |
| Sward Hardness, percent of glass | 31 | 30 | 28 | 37 | 16 |
| Impact strength of film on 1/32-inch steel, in.-lb.: | | | | | |
| a. Forward | 30 | 30 | 30 | 30 | 30 |
| b. Reverse | 5 | 30 | 30 | 30 | 30 |
| Adhesion to steel: | | | | | |
| a. Dry test | ([5]) | ([5]) | ([5]) | ([5]) | ([5]) |
| b. Wet test | ([5]) | ([5]) | ([5]) | ([5]) | ([5]) |

[1] Neville's chlorinated paraffin wax plasticizer, 40 weight percent Cl, refractive index=1.504, molecular weight=560, specific gravity=1.15.
[2] Neville's chlorinated paraffin wax resin, 70 weight percent Cl, refractive index=1.535, specific gravity=1.65, molecular weight=1,060, ring and ball softening point=100° C.
[3] Monsanto's chlorinated terphenyls, refractive index=1.660–1.665, softening point=100–105.5° C. specific gravity=1.67.
[4] Monsanto's chlorinated biphenyls, refractive index=1.647–1.649, pour point (ASTM D-97)=31° C., specific gravity=1.62.
[5] Excellent.

EXAMPLE 21

The following white paint was made by dissolving the first four ingredients in xylene at 25° C. After complete solution was obtained, the $TiO_2$ was pebble milled into the solution for 24 hours.

| Ingredient: | Weight percent |
|---|---|
| Chlorinated oxidized polyethylene (63.9% Cl) | 15.90 |
| Elvax 40 ethylene-vinyl acetate copolymer (40% vinyl acetate) | 7.90 |
| Arochlor 1260 | 2.41 |
| Epoxy stabilizer | .39 |
| Xylene | 52.40 |
| $TiO_2$ | 21.00 |
| | 100.00 |

PROPERTIES

| | |
|---|---|
| Weight percent solids | 46.6. |
| Viscosity at 25° C., cp. | 530. |
| Pigment volume concentration | 20 percent. |
| Gloss | Excellent. |
| Impact strength of one coat on 1/32-inch steel, in.-lb.: | |
| (a) Forward | 30. |
| (b) Reverse | 30. |
| Adhesion to steel: | |
| (a) Dry test | Excellent. |
| (b) Wet test | Do. |
| Adhesion to aluminum: | |
| (a) Dry test | Excellent. |
| (b) Wet test | Do. |
| Resistance [1] to: | |
| 50 percent $H_2SO_4$ | Excellent. |
| 10 percent $H_2SO_4$ | Do. |
| 86 percent $H_3PO_4$ | Do. |
| 10 percent HCl | Do. |
| 50 percent KOH | Do. |
| 10 percent KOH | Do. |
| 1 percent KOH | Do. |

[1] One-week spot tests at 77° F.
Excellent means no noticeable effect.

It is therefore apparent that the coatings prepared from the chlorinated carboxyl group containing polymers and ethylene vinyl acetate copolymers of this invention can be used as coatings for various substrates. Furthermore, the coatings prepared from these blends have good physical properties including excellent adhesion to the substrate.

The invention has been described in detail with particular reference to preferred embodiments thereof, but it will be understood that variations and modifications can be effected within the spirit and scope of the invention as described hereinabove and as defined in the appended claims.

We claim:

1. Compositions comprising blends of (A) a chlorinated carboxyl group containing polymer of the group consisting of polyolefin and natural rubber having a chlorine content of from 50 to 75 weight percent, said chlorinated carboxyl group containing polymer having a saponification number of at least 6, and (B) from about 10 to 90 weight percent of ethylene-vinyl acetate copolymer.

2. Compositions according to claim 1, wherein the chlorinated carboxyl group containing polymer contains 60 to 70 weight percent chlorine.

3. Compositions according to claim 2, wherein the ethylene-vinyl acetate is present in an amount of from 30 to 50 percent by weight.

4. Compositions according to claim 3, wherein the chlorinated carboxyl group containing polymer contains 65 weight percent chlorine.

5. Compositions according to claim 3, wherein the chlorinated carboxyl containing polymer is a chlorinated oxidized polyethylene.

6. Compositions according to claim 3 wherein the chlorinated carboxyl containing polymer is a chlorinated oxidized polyethylene telomer.

7. Compositions according to claim 3, wherein the chlorinated carboxyl containing polymer is a chlorinated oxidized polypropylene.

8. Compositions according to claim 3, wherein the chlorinated carboxyl containing polymer is a chlorinated maleated polyethylene.

9. Compositions according to claim 3, wherein the chlorinated carboxyl containing polymer is a chlorinated maleated natural rubber.

10. Compositions according to claim 3, wherein the chlorinated carboxyl containing polymer is a chlorinated maleated polybutadiene rubber.

11. Compositions according to claim 3, wherein the chlorinated carboxyl containing polymer is a chlorinated maleated polypropylene.

12. An article of manufacture comprising a solid substrate having upon a surface thereof a layer comprising the composition of claim 1.

References Cited

UNITED STATES PATENTS 3,326,833  6/1967  Raley .......... 260—28.5
3,278,645  10/1966  Paoloni .......... 260—897

MURRAY TILLMAN, Primary Examiner

C. J. SECCURO, Assistant Examiner

U.S. Cl. X.R.

117—128.4, 132, 138.8; 260—28.5, 30.6, 33.8, 889, 897